(12) United States Patent
Ding et al.

(10) Patent No.: US 10,327,291 B2
(45) Date of Patent: Jun. 18, 2019

(54) LAMP DRIVER FOR AN LED LAMP AND LED LAMP FOR PLACEMENT INTO A FLUORESCENT LAMP FIXTURE

(71) Applicant: LEDVANCE GmbH, Garching bei Munchen (DE)

(72) Inventors: ShiYu Ding, Shenzhen, Guangdong (CN); Xusheng Yang, Shenzhen, Guangdong (CN)

(73) Assignee: LEDVANCE GMBH, Garching Bei Munchen (DE)

(*) Notice: Subject to any disclaimer, the term of this patent is extended or adjusted under 35 U.S.C. 154(b) by 0 days.

(21) Appl. No.: 15/936,930

(22) Filed: Mar. 27, 2018

(65) Prior Publication Data

US 2018/0288842 A1 Oct. 4, 2018

(30) Foreign Application Priority Data

Mar. 31, 2017 (CN) .......................... 2017 1 02070888

(51) Int. Cl.
*H05B 33/08* (2006.01)
*H02H 9/00* (2006.01)

(52) U.S. Cl.
CPC ..... *H05B 33/0815* (2013.01); *H05B 33/0809* (2013.01)

(58) Field of Classification Search
CPC ............... H05B 33/08; H05B 33/0815; H05B 33/0824; H05B 33/0842; H05B 37/02; H02H 9/00; H02H 9/02; H02H 9/04; H02H 9/001
See application file for complete search history.

(56) References Cited

U.S. PATENT DOCUMENTS

| 8,923,020 | B2 * | 12/2014 | Tazawa | H02M 3/33523 |
| | | | | 363/21.07 |
| 2010/0001695 | A1 * | 1/2010 | Arai | H02J 7/0065 |
| | | | | 320/162 |
| 2016/0344184 | A1 * | 11/2016 | Sundara Moorthy | |
| | | | | H05B 33/0884 |
| 2017/0141565 | A1 * | 5/2017 | White | H02H 9/001 |
| 2018/0083438 | A1 * | 3/2018 | Reed | H05B 33/0887 |
| 2018/0279430 | A1 * | 9/2018 | Storm | H05B 33/0815 |

* cited by examiner

*Primary Examiner* — Thai Pham
(74) *Attorney, Agent, or Firm* — Hayes Soloway PC

(57) ABSTRACT

A lamp driver for an LED lamp is provided, comprising a voltage input port for connecting the lamp driver to a power source, a relay that is switchable between an energized state and a de-energized state according to a pick-up voltage, and a relay controller circuit that connects the relay to the voltage input port and that is switchable between a conducting state and an non-conducting state according to a threshold voltage, wherein the pick-up voltage is smaller than the threshold voltage.

12 Claims, 5 Drawing Sheets

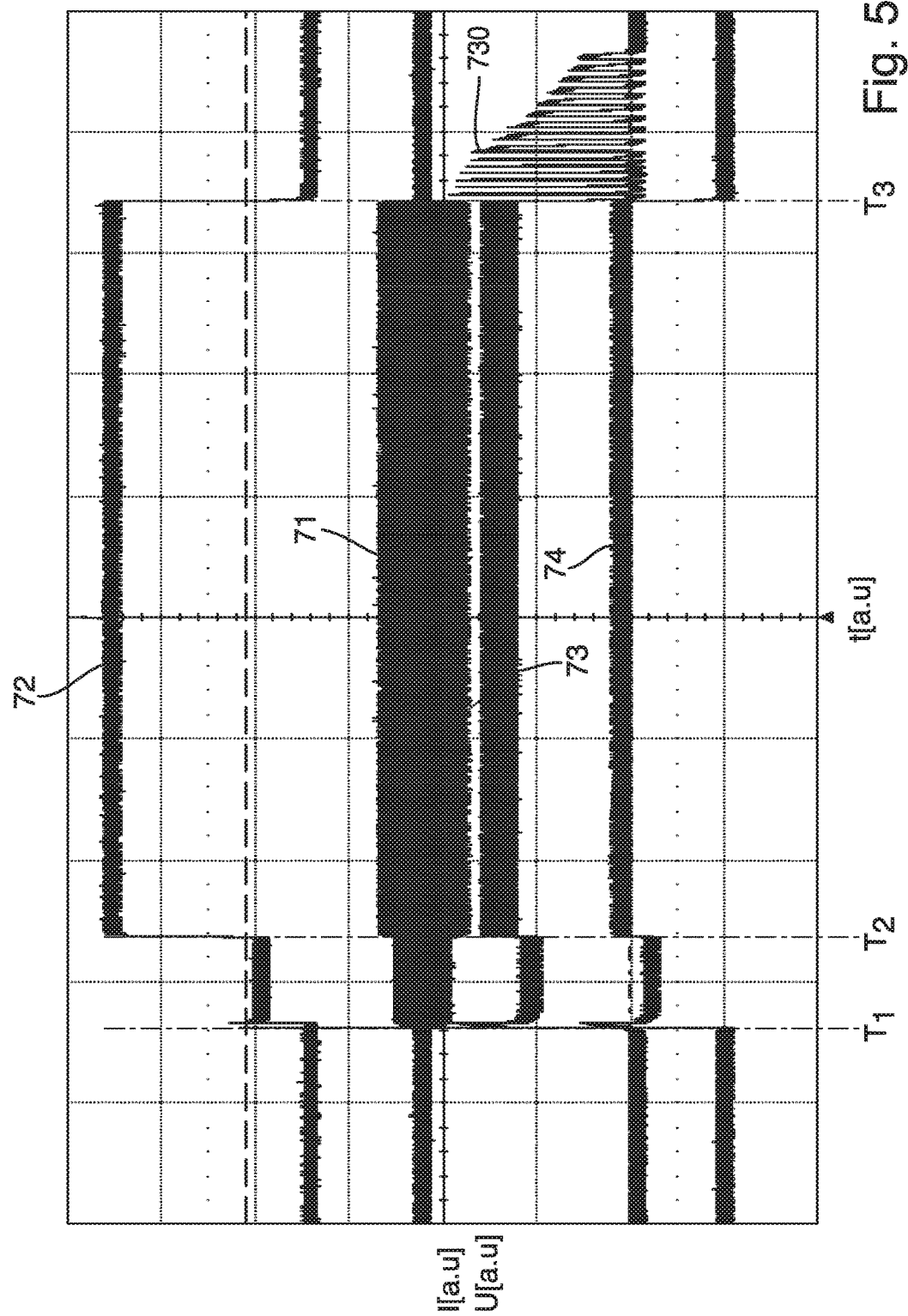

LAMP DRIVER FOR AN LED LAMP AND LED LAMP FOR PLACEMENT INTO A FLUORESCENT LAMP FIXTURE

CROSS-REFERENCE TO RELATED APPLICATIONS AND PRIORITY

This patent application claims priority from Chinese Patent Application No. 2017102070888 filed on Mar. 31, 2017. This patent application is herein incorporated by reference in its entirety.

TECHNICAL FIELD

The present invention relates to a lamp driver for an LED lamp and an LED lamp for placement into a fluorescent lamp fixture.

BACKGROUND

Fluorescent lamps have been commonly known and widespread lighting devices as efficient alternatives for incandescent lightbulbs. However, with the advent of LED lamps (LED being the abbreviation for light-emitting diode), even more efficient and long-lived lighting means are available. Furthermore, in comparison to fluorescent lamps, materials of LED lamps are safer since, for example, no mercury is required. Therefore, there is a demand for replacing existing fluorescent lamps with LED lamps, preferably without having to change the entire luminaire or the lamp fixture.

Currently available fluorescent lamp fixtures normally comprise so-called electronic ballasts (also called electronic control gear, ECG) for regulating and limiting the current that is provided to the fluorescent lamp. The electronic ballast usually operates the lamp at high frequencies of up to 50 kHz. The frequency of the electronic ballasts is chosen such that the resonance frequency of the fluorescent gas is hit, thereby enabling active control of the current through the fluorescent lamp and resulting in an increased efficiency of the fluorescent lamp.

Some electronic ballasts have a residual voltage output after the electronic ballast has been turned off. This residual voltage output is due to residual energy stored in the electronic circuit of the electronic ballast. After turn-off, i.e. power down, this residual energy is released slowly, thereby causing residual voltage and/or current pulses at a frequency of less than 10 Hz. If a regular fluorescent lamp tube is connected to the electronic ballast, these residual pulses will not cause the fluorescent lamp to restart since the voltage is too small. However, in the case of an LED lamp, in particular a passive LED tube lamp, being connected to the electronic ballast, the residual voltage and/or current pulses are high enough to restart the LEDs in the LED lamp, thus causing flickering and/or flashing of the LED lamp. After the electronic circuit of the electronic ballast is de-energized, no more residual voltage and/or current pulses can be observed.

For connecting an LED lamp to an electronic ballast, LED lamps usually comprise a lamp driver that adjusts the voltage and/or current provided by the electronic ballast to the voltage and/or current requirements of the LEDs. However, currently available lamp drivers do not solve the problem of flickering and/or flashing during turn-off of the LED lamp by turning off the electronic ballast.

SUMMARY OF THE INVENTION

In view of the afore-described disadvantages of currently known lamp drivers, it is an object of the present invention to provide a lamp driver that reduces, preferably eliminates, restarts of the LED lamp by residual voltage pulses. A further object of the present invention is to provide an LED lamp with such an LED driver.

This object is solved by a lamp driver and an LED lamp according to the independent claims. Preferred embodiments are given by the dependent claims, the description and the drawings.

Accordingly, a lamp driver for an LED lamp is provided. The lamp driver comprises a voltage input port for connecting the lamp driver to a power source, a relay, and a relay controller circuit. The relay, in particular a coil of the relay, is connected to the voltage input port by the relay controller circuit. The relay is switchable between an energized state and a de-energized state according to a pick-up voltage. The relay controller circuit is switchable between a conducting state and a non-conducting state according to a threshold voltage. According to the invention, the pick-up voltage is smaller than the threshold voltage.

One key idea of the present invention is to provide a relay controller circuit before the relay circuit, which usually provides the coupling to the LEDs of the LED lamp. Due to this relay controller circuit, residual voltage pulses, that might trigger the relay and switch it into the energized state, are blocked. The relay controller circuit may thus provide the function of an additional switch coupled in between the voltage input port and the relay. Thereby, the driving voltage of the relay is essentially raised to the threshold voltage.

The relay may be a regular electromagnetic relay with a magnetic coil. Alternatively, a solid-state relay may be used. An input port of the relay may be connected to an output port of the relay controller circuit. An output port of the relay may be connectable to an LED of the LED lamp.

In the de-energized state, the relay is non-conducting (also called "open state"). In the energized state, the relay is conducting (also called "closed state"). The energized state and the de-energized state may be provided by the respective state of relay coils of the relay. An input port of the relay may correspond to the coils of the relay. If the relay is in the energized state, the output port of the relay, and thus an LED that may be connected to the output port, is preferably connected to the voltage input port of the lamp driver.

The relay switches from the de-energized state into the energized state when the driving voltage applied to the coils of the relay exceeds the pick-up voltage (also called "pull-in voltage"). That is to say, the pick-up voltage of the relay is the minimum voltage at which the relay is guaranteed to switch into the energized state when the voltage at a relay input is increased. The relay switches back from the energized state to the de-energized state when the voltage applied to the coils of the relay falls below the dropout voltage during a voltage decrease. The dropout voltage is usually smaller than the pick-up voltage. In particular, the dropout voltage is smaller than the threshold voltage.

Similarly, the relay controller circuit switches from the non-conducting, i.e. insulating, state into the conducting state when the voltage applied to an input port of the relay controller circuit exceeds the threshold voltage. For example, an input port of the relay controller circuit may be coupled to the voltage input port via a transformer of the relay controller circuit. The relay controller circuit may switch backed to the non-conducting state if the voltage applied to the input port of the relay controller circuit falls below a low-threshold voltage. The low-threshold voltage may be identical to the threshold voltage.

In a preferred embodiment of the lamp driver, the relay is connected to the voltage input port only if the relay controller circuit is in the conducting state. The relay may therefore switch-on the connection between the voltage input port and an LED load only if the relay controller circuit is in the conducting state. That is to say, the relay is connected to the voltage input port only via the relay controller circuit and, if applicable, an additional transformer. Further, an LED load may be connected to the voltage input port only via the relay, and if applicable an additional transformer, wherein the energization state of the relay is triggered by the relay controller circuit. No further connections may be present between the relay and the voltage input port and/or an LED load and the voltage input. In addition, or as an alternative, further connections between the relay controller circuit and the voltage input port may comprise diodes that are connected with the voltage input port and/or the relay controller circuit such that they are operated in blocking mode when a voltage applied to the voltage input port is lower than the threshold voltage.

According to at least one embodiment, the lamp driver is adapted for being connected to an electronic ballast of a fluorescent lamp fixture as a power source. In other words, the power source that is connectable to the voltage input port of the lamp driver may be an electronic ballast of a fluorescent lamp fixture.

According to at least one embodiment of the lamp driver, the threshold voltage is lower than an operation voltage of the power source and higher than a residual voltage pulse of the power source provided during a turn-off procedure of the power source. The operation voltage is a peak value of the voltage provided by the power source during normal operation. The residual voltage pulse is the peak value of the voltage provided by the power source during power down. The residual voltage pulse may be smaller than the operation voltage. The threshold voltage may thus be chosen such that it lies in between the operation voltage and the residual voltage pulse.

Therefore, during operation of the lamp driver, the voltage input port, and thus the power source, may only be connected to the relay if the voltage applied to the voltage input port exceeds the value of the residual voltage pulse in the turn-off state.

According to at least one embodiment of the lamp driver, the relay controller circuit is adapted for being latched in the conducting state during a normal operation of the power source. Further, the lamp driver, in particular the relay controller circuit, is adapted for releasing the latch when the power source is turned off and/or the relay is de-energized. Hereinafter, a "normal operation" of the power source is an operation state in which an operation voltage and/or operation current is applied to the voltage input port by use of the power source, wherein the operation voltage and/or operation current is adapted for providing power to an LED connected to the lamp driver. In particular, an LED lamp that is connected to the lamp driver emits light during normal operation. During turn-off of the power source, the above-mentioned residual voltage pulses are applied to the voltage input port by the power source, which requires the relay controller circuit to attenuate or even eliminate these pulses that may be coupled to the relay coils.

According to at least one embodiment of the lamp driver, the relay circuit is connected in parallel to a filtering capacitor that is connected to an input port of the relay controller circuit. The relay controller circuit is latched by a voltage drop at the filtering capacitor and/or the relay circuit.

The filtering capacitor may be adapted for latching the relay controller circuit in the conducting state if the relay is switching to and/or is in the energized state. When the relay switches to the energized state, an LED load may be connected to the lamp driver circuit. This LED load may cause a voltage drop along the lamp driver. The voltage may even fall below the threshold voltage. In order to prevent this voltage drop to cause the relay controller circuit to switch to the non-conducting state, the voltage drop at the relay is transferred to the relay controller circuit. Here, the filtering capacitor delays the effect of the voltage drop on the relay controller circuit according to the filtering capacitor's time scale. Thereby, a voltage drop at an input port of the relay controller circuit may be latched during normal operation of the LED lamp, thus keeping the relay controller circuit in the conducting state.

Preferably, the relay controller circuit is adapted for switching from the conducting state into the non-conducting state if the input voltage falls below a low-threshold voltage that is smaller than the threshold voltage. The low-threshold voltage may be larger than the voltage drop at the relay and/or the delay capacitor during normal operation.

According to a preferred embodiment of the lamp driver, the relay controller circuit comprises a trigger circuit and a switch. The switch is switchable between the conducting state and the non-conducting state depending on an output signal of the trigger circuit. For this, a control port of the switch, such as for example a gate port and/or a base port of the switch, may be connected to an output port of the trigger circuit. The switch may be a transistor, in particular a field-effect transistor.

The trigger circuit may be adapted for providing a high voltage signal at its output port if a voltage at an input port of the trigger circuit exceeds the threshold voltage and a low voltage signal at the output port of the trigger circuit if the voltage at the input port of the trigger circuit falls below the threshold voltage for a certain amount of time. The switch may be switched into the conducting state if the high voltage signal is applied to control port of the switch and may be in the non-conducting state when the low voltage signal is applied to the control port. The trigger circuit may the latching function as described above. The trigger circuit may comprise at least two coupled transistors for enabling the triggering behavior.

Further, an LED lamp for placement into a fluorescent lamp fixture is provided. The LED lamp comprises a lamp driver as described above. That is to say, all features that are disclosed for the lamp driver are also disclosed for the LED lamp and vice versa.

The LED lamp comprise the above-described lamp driver with the relay, the voltage input port, and the relay controller circuit, and an LED. The LED is connected to an output port of the relay of the lamp driver. The LED may be comprised by an LED group with a plurality of LEDs. During normal operation of the LED lamp, the LED may emit visible light, in particular white light.

According to at least one embodiment of the LED lamp, the LED is connected to the voltage input port only if the relay is in the energized state. In other words, the relay is the only conducting connection between the LED and the voltage input port. By this, it is possible to ensure that the LED only emits light if the voltage applied to the voltage input port exceeds at least the pick-up voltage.

According to at least one embodiment of the LED lamp, the lamp driver is adapted for providing a voltage to the LED only if the input voltage applied to the voltage input port exceeds the threshold voltage. That is to say, the LED may only be connected to the voltage input port if the relay controller circuit is in the conducting state. Therefore, the LED may only emit light if the voltage at the voltage input port exceeds the threshold voltage, thereby preventing flickering during a turn-off process.

BRIEF DESCRIPTION OF THE DRAWINGS

Preferred embodiments of the invention will be explained in the following, having regard to the drawings. It is shown in:

FIG. 5 shows a turn-off current behavior of an electronic ballast and an LED lamp according to the present invention connected to the electronic ballast.

DETAILED DESCRIPTION OF THE INVENTION

Figure 1:
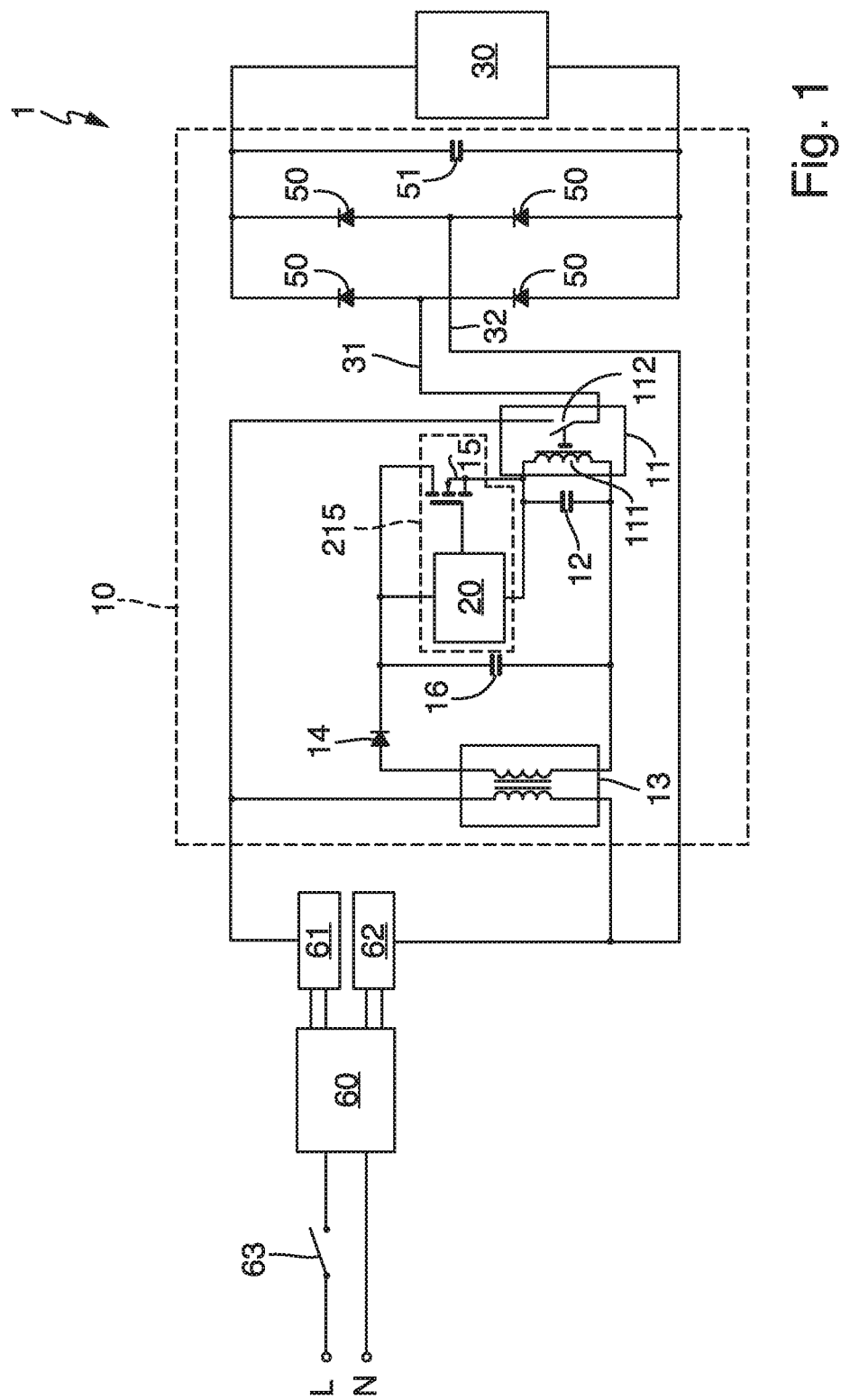
FIGS. 1 and 2 show exemplary embodiments of a lamp driver and an LED lamp according to the present invention.

In the following, preferred embodiments of the invention will be described with reference to the drawings. Here, elements that are identical, similar or have an identical or similar effect are provided with the same reference numerals in the figures. Repeating the description of such elements may be omitted in order to prevent redundant descriptions.

The figures and the size relationships of the elements illustrated in the figures among one another should not be regarded as to scale. Rather, individual elements may be illustrated with an exaggerated size to enable better illustration and/or better understanding.

With reference to the schematic circuit diagram of FIG. 1 an embodiment of an LED lamp 1 with a lamp driver 10 according to the present invention is explained in detail. The LED lamp 1 comprises the lamp driver 10 and an LED 30, which may also be a group of LEDs 30. The LED 30 may constitute an LED load. The LED lamp 1 is connected to a power source 60, which may be an electronic ballast, via voltage input ports 61, 62. The power source 60 is connected to a network power supply having a line port (L) and a neutral port (N). The connection to the network power supply is provided via a power switch 63. The power switch 63 may be the on/off-switch of the LED lamp 1.

The lamp driver 10 comprises a transformer 13, which connects the remaining circuit components to the voltage input ports 61, 62 and a relay controller circuit 215, which comprises a trigger circuit 20 and a switch 15, which is an n-type field-effect transistor in the exemplary embodiment of FIG. 1. The trigger circuit 20 is connected to the gate of the switch 15 which acts as a control port of the switch 15. An input diode 14 is connected in between the drain of the switch 15 and the transformer 13.

The lamp driver 10 further comprises a relay 11 with a relay coil 111 and a relay switch 112 and a delay circuit 12 connected in parallel to the relay. A first input port of the relay 11 is connected to the source of the switch 15. A further capacitor 16 is connected in parallel to the combination of the relay controller circuit 215 and the relay 11.

Output ports of the relay 11 act as LED circuit input ports 31, 32 that lead to an LED circuit part of the lamp driver 10 that is connected to the LED 30. A rectifier circuit with rectifier diodes 50 is coupled in between the LED circuit input ports 31, 32. Further, a further filter capacitor 51 is connected in parallel to the LED 30, which filters high-frequency components from the voltage and/or current provided to the LED 30.

Figure 2:
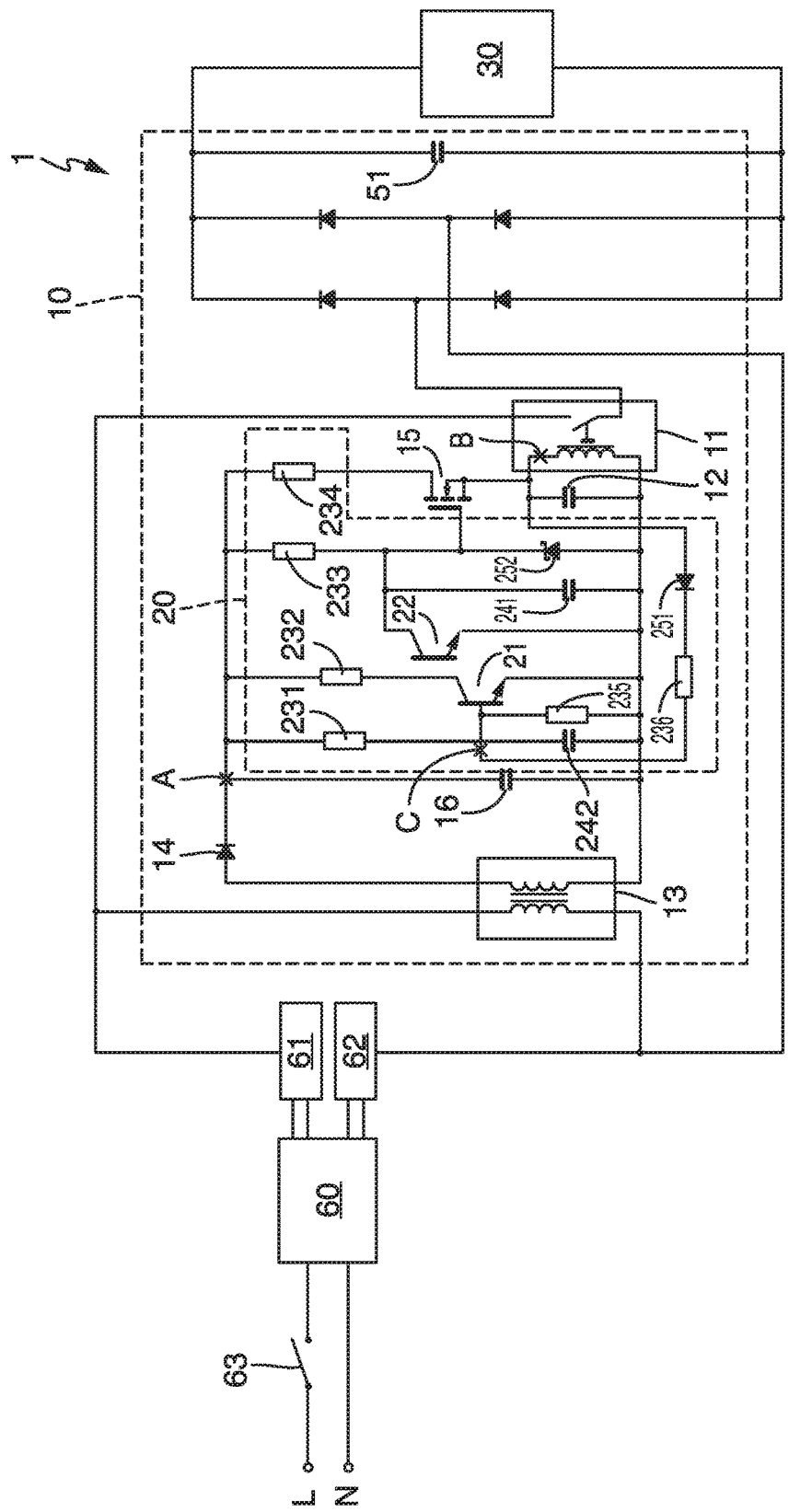

With reference to the schematic circuit diagram of FIG. 2 an embodiment of an LED lamp 1 according to the present invention is explained in detail. In comparison to FIG. 1, a more detailed structure is shown for the trigger circuit 20. The trigger circuit 20 comprises a first transistor 21 and a second transistor 22 coupled to the first transistor 21. The first transistor 21 and the second transistor 22 are both npn transistors in the present case. The second transistor 22 is connected to the collector of the first transistor 21. Further, the collector of the second transistor 22 is connected to the switch 15. The respective emitter of the first transistor 21 and the second transistor 22 is coupled with a second input port of the relay circuit 11. As before in FIG. 1, the first input port of the relay circuit 11 is connected to the source of the switch 15.

The trigger circuit 20 further comprises resistors 231, 232, 233, 234, 235 for adjusting the input voltages and/or input currents along the circuit strings of the trigger circuit 20. In addition, a Zener diode 252 is coupled to the relay 10 for preventing the switch 15 from high voltage and/or for limiting the voltage provided to the relay coils 111. An input port of the trigger circuit 20 is connected to the filtering capacitor 12, and thus to the first input port of the relay 11, via a filtering diode 251 and a filtering resistor 236.

During operation of the LED lamp 1, the lamp driver 10 and the LED lamp 1 may act as explained in the following.

The LED lamp 1 is turned on by closing the power switch 63, i.e. switching the power switch 63 into its conducting state. The voltage at a first point A in the circuit will then rise to a first voltage value and/or above this first voltage value. The first voltage value may, for example, be 40 V. The first voltage value may correspond to the threshold voltage or may exceed the threshold voltage of the relay controller circuit 215. Due to the voltage rise, the first transistor 21 is closed (i.e. conducting) and the second transistor 22 is opened (i.e. insulating). This leads to the switch 15 changing into the conducting state.

When the switch 15 is in the conducting state, the relay 11 switches the connection between the power source 60 and the LED 30 on. A second voltage value (for example, 12 V) will then be measured at a second point B of the lamp driver 10. The second voltage value is higher than the pick-up voltage of the relay 11. Therefore, the relay 11 is switched to its energized state and the LED 30 is connected to the power source 60. In this conducting state of the switch 15, the delay capacitor 12 may be charged by the current provided by the power source 60.

With the LED 30 being connected to the power source 60, the current in the entire circuit rises and the voltage therefore drops to a third voltage value (for example 15 V) at the first point A. However, due to the filtering capacitor 12, the voltage drop at a third point C in the circuit is delayed, which results in the first transistor 21 being still closed for a short time scale corresponding to the time scale of the filtering capacitor 12. Therefore, the switch 15 is also kept in the conducting state for this short time scale.

During this short time scale, the voltage at the second point B will still be the second voltage value. This second voltage value is transferred to the third point C via the diode 251 and the resistor 236. Thereby, the voltage at the third point C is latched to the second voltage value. The switch 15 therefore stays in the conducting state during normal operation of the power source 60.

When the power switch 63 opened, the power source is disconnected from the network power supply. Therefore, the voltage drop at the second point B is reduced and the latch is removed. Due to residual energy stored in the power source 60, the power source 60 will produce residual voltage pulses. These residual voltage pulses are, however, smaller than the threshold voltage of the relay controller circuit 215. Therefore, the switch 15 cannot be switched back to the conducting state and the LED 30 is kept off.

Figure 3:
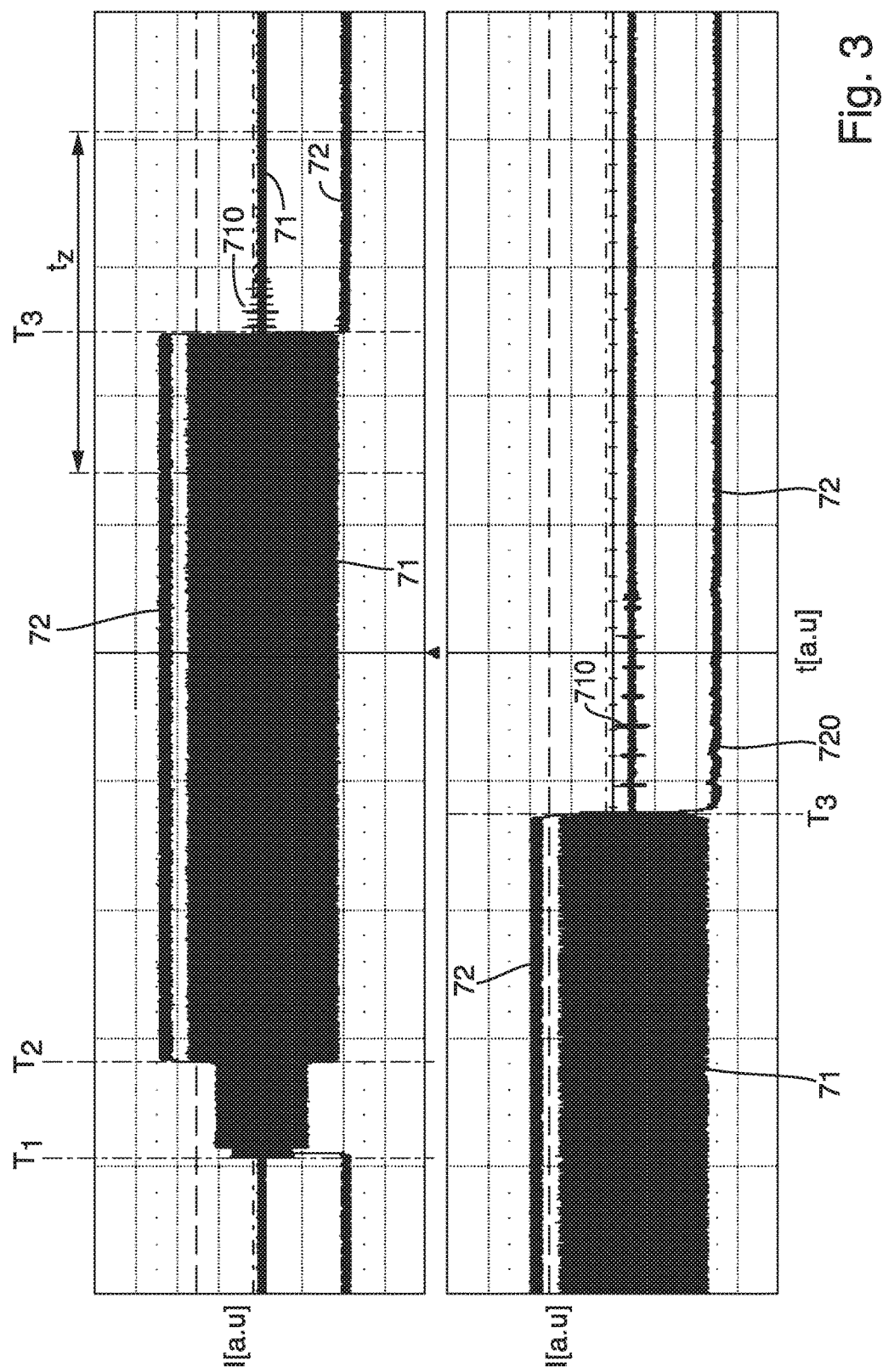
FIGS. 3 and 4 show a turn-off behavior of an electronic ballast and an alternative LED lamp connected to the electronic ballast.
Figure 4:
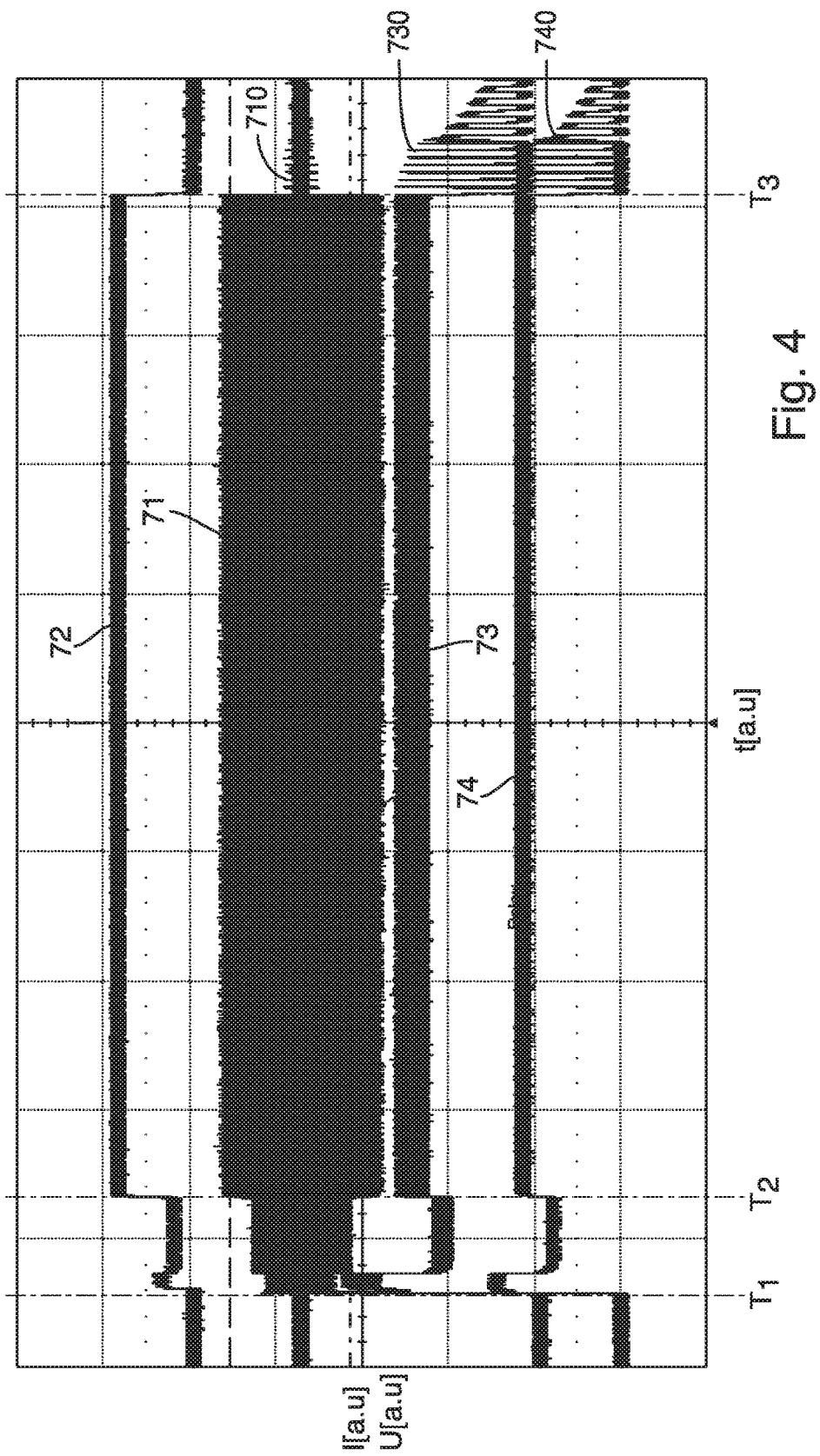

With reference to the measurement data of turn-off behavior shown in FIGS. 3, 4 and 5, a working principle of the lamp driver 10 and the LED lamp 1 according to the present invention are explained in detail. In the Figures, currents and/or voltages are shown in arbitrary units (a.u.) as a function of time. Each of the FIGS. 3, 4 and 5 show a first current 71, corresponding to an output current of a power source 60 connected to the LED lamp 1, and a second current 72 at the position of the LED 30. Here, the lower part of FIG. 3 shows a scale-up of a zoom-time $t_z$ shown in the upper part of FIG. 3. FIGS. 4 and 5 additionally show a first voltage drop 73 at the input port of the trigger circuit 20 and a second voltage drop 74 at the relay coil 111.

The data according to FIGS. 3 and 4 has been acquired with an alternative LED lamp 1 that has a similar electronics circuit as shown with reference to the embodiment of FIGS. 1 and 2, but does not comprise a relay controller circuit 215. The data according to FIG. 5 has been acquired with an LED lamp 1 as shown with reference to FIG. 2.

For the measurements, the power switch 63 is closed at a first time $T_1$. The relay 11 switches to the energized state at a second time $T_2$. The power switch 63 is opened at a third time $T_3$. After the power switch 63 is closed, the first current 71, which is an AC current, rises. This results in a small rise of the second current 72. When the relay 11 is closed, i.e. switched to the energized state, the first current 71 and the second current 72 reach a maximum value which is the operation current of the LED lamp 1.

After the power switch 63 is opened, the first current 71 and the second current 72 are reduced to their initial values. However, as can be seen in the scale-up in the lower part of FIG. 3, there are residual current pulses 710, corresponding to the above-mentioned residual voltage pulses. These residual current pulses 710 may cause second current pulses 720 in the second current 72 at the LED 30.

FIGS. 4 and 5 show the first current 71 and the second current 72 from FIG. 3 and, in addition, the first voltage 73 and the second voltage 74. In FIG. 4, which corresponds to an LED lamp 1 without a relay controller circuit 215, the residual current pulses 710 cause first voltage pulses 730 in the first voltage 73 and second voltage pulses 740 in the second voltage 74. These second voltage pulses 740 are applied to the LED 30 via the LED circuit input ports 31, 32, thereby causing flickering of the LED lamp 1.

For the measurement of FIG. 5, a relay controller circuit 215 is added to the lamp drive 10 of the LED lamp 1. The first voltage pulses 730 in the first voltage 73 can still be observed. However, since the relay 11 is decoupled from the power source 60 by the relay controller circuit 215, no second voltage pulses 740 are observed in the second voltage 74.

With the lamp driver described herein, a simple control over the turn-off process of a power source, in particular an electronic ballast, with a good performance may be provided. Since only standard electronic components are required for implementing the lamp driver, the lamp driver can be produced in a cost-effective manner.

The invention is not restricted by the description based on the embodiments. Rather, the invention comprises any new feature and also any combination of features, including in particular any combination of features in the patent claims, even if this feature or this combination itself is not explicitly specified in the patent claims or exemplary embodiments.

LIST OF REFERENCE NUMERALS

1 LED lamp
10 Lamp driver
11 Relay circuit
111 Relay coil
112 Relay switch
12 Filtering capacitor
13 Transformer
14 Input diode
15 Switch
16 Further capacitor
215 Relay controller circuit
20 Trigger circuit
21 First transistor
22 Second transistor
231,232,233,234,235 Resistor
236 Resistor
251 Diode
252 Zener diode
30 LED
31,32 LED circuit input ports
50 Rectifier diode
51 Further filtering capacitor
60 Power source
61, 62 Voltage input port
63 Power Switch
71 First current
710 Residual current pulses
72 Second current
720 Second current pulses
73 First voltage
730 First voltage pulses
74 Second voltage
740 Second voltage pulses
$T_1$ First time
$T_2$ Second time
$T_3$ Third time
A First point
B Second point
C Third point

The invention claimed is:

1. A lamp driver for an LED lamp, the lamp driver comprising:
   a voltage input port for connecting the lamp driver to a power source;
   a relay that is switchable between an energized state and a de-energized state according to a pick-up voltage corresponding to a minimum voltage at which the relay switches into the energized state when a voltage at an input of the relay is increased; and
   a relay controller circuit that connects the relay to the voltage input port and that is switchable between a conducting state and a non-conducting state according to a designated threshold voltage of the relay controller circuit;
   wherein the pick-up voltage is smaller than the threshold voltage.

2. The lamp driver of claim 1, wherein the relay is connected to the voltage input port only when the relay controller circuit is in the conducting state.

3. The lamp driver of claim 1, wherein the lamp driver is adapted for being connected to an electronic ballast of a fluorescent lamp fixture as the power source.

4. The lamp driver of claim 1, wherein the threshold voltage is:
  lower than an operation voltage of the power source, the operation voltage corresponding to a peak value of a voltage provided by the power source during normal operation thereof; and
  higher than a residual voltage pulse of the power source provided during a turn-off procedure of the power source, the residual voltage pulse corresponding to a peak value of a voltage provided by the power source during the turn-off procedure.

5. The lamp driver of claim 1, wherein the relay controller circuit is adapted for being latched in the conducting state during a normal operation of the power source, and wherein the lamp driver is adapted for releasing the latch when the power source is turned off.

6. The lamp driver of claim 5, wherein the relay circuit is connected in parallel to a filtering capacitor that is connected to an input port of the relay controller circuit, and wherein the relay controller circuit is latched by a voltage drop at least one of at the filtering capacitor and at the relay.

7. The lamp driver of claim 6, wherein the relay controller circuit is adapted for switching from the conducting state into the non-conducting state when the input voltage falls below a low-threshold voltage that is smaller than the threshold voltage.

8. The lamp driver of claim 1, wherein the relay controller circuit is adapted for switching from the conducting state into the non-conducting state when the input voltage falls below at least one of the threshold voltage and a lower threshold voltage for a first time duration that is at least a period duration of an AC voltage applied to the voltage input port.

9. The lamp driver of claim 1, wherein the relay controller circuit comprises a trigger circuit and a switch, the switch being switchable between the conducting state and the non-conducting state depending on an output signal of the trigger circuit.

10. An LED lamp for placement into a fluorescent lamp fixture, the LED lamp comprising:
  the lamp driver according to claim 1; and
  an LED that is connected to an output port of the relay of the lamp driver.

11. The LED lamp of claim 10, wherein the LED is connected to the voltage input port only when the relay is in the energized state.

12. The LED lamp of claim 11, wherein the lamp driver is adapted for providing a voltage to the LED only when the input voltage applied to the voltage input port exceeds the threshold voltage.

* * * * *